United States Patent
Car et al.

(10) Patent No.: US 11,098,633 B2
(45) Date of Patent: Aug. 24, 2021

(54) EXHAUST GAS AFTERTREATMENT SYSTEM FOR AN INTERNAL COMBUSTION ENGINE

(71) Applicant: VOLKSWAGEN AKTIENGESELLSCHAFT, Wolfsburg (DE)

(72) Inventors: Onur Ulas Car, Berlin (DE); Markus Paulovsky, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/719,477

(22) Filed: Dec. 18, 2019

(65) Prior Publication Data

US 2020/0208556 A1    Jul. 2, 2020

(30) Foreign Application Priority Data

Dec. 27, 2018   (DE) ............... 10 2018 133 634.9

(51) Int. Cl.
*F01N 13/00*     (2010.01)
*F01N 3/035*     (2006.01)
*F01N 13/18*     (2010.01)

(52) U.S. Cl.
CPC ....... *F01N 13/0097* (2014.06); *F01N 13/009* (2014.06); *F01N 13/0093* (2014.06);
(Continued)

(58) Field of Classification Search
CPC ............... F01N 13/009; F01N 13/0093; F01N 13/0097; F01N 2240/20; F01N 2340/02; F01N 2470/08; F01N 2470/18
See application file for complete search history.

(56) References Cited

U.S. PATENT DOCUMENTS

2011/0219755 A1* 9/2011 Muller-Haas ....... F01N 13/0097
                                                                60/287
2012/0198838 A1   8/2012 Bruck et al.
(Continued)

FOREIGN PATENT DOCUMENTS

CN    106321204 A    1/2017
CN    107060959 A    8/2017
(Continued)

OTHER PUBLICATIONS

Search report for European Patent Application No. EP 19 21 8462, dated Apr. 1, 2020.
(Continued)

*Primary Examiner* — Jonathan R Matthias
(74) *Attorney, Agent, or Firm* — Pearl Cohen Zedek Latzer Baratz LLP

(57) ABSTRACT

The invention relates to an exhaust gas aftertreatment system for an internal combustion engine comprising a first catalytic converter that has a first exhaust gas inlet to admit the exhaust gas into the first catalytic converter and has an exhaust gas outlet positioned on the opposite side, also comprising a second catalytic converter that is arranged downstream from the first catalytic converter and that is flow-connected to the first catalytic converter in order to allow the exhaust gas to pass from the first catalytic converter into the second catalytic converter and that likewise has a second exhaust gas inlet that is at a physical distance from the exhaust gas outlet of the first catalytic converter. The exhaust gas aftertreatment system also comprises a particulate filter that is arranged downstream from the second catalytic converter and that is flow-connected to the second catalytic converter in order to allow the exhaust gas to pass from the second catalytic converter into the particulate filter. A flow-around area is formed adjacent to an outer surface of the first catalytic converter in which the exhaust (Continued)

gas flows from the exhaust gas outlet to the second exhaust gas inlet into the second catalytic converter.

12 Claims, 1 Drawing Sheet

(52) U.S. Cl.
CPC .......... *F01N 3/035* (2013.01); *F01N 13/1888* (2013.01); *F01N 2240/20* (2013.01); *F01N 2340/02* (2013.01); *F01N 2470/08* (2013.01)

(56) References Cited

U.S. PATENT DOCUMENTS

| | | | |
|---|---|---|---|
| 2012/0260639 | A1 | 10/2012 | Brück |
| 2013/0115145 | A1 | 5/2013 | Umemoto et al. |
| 2013/0152557 | A1* | 6/2013 | Brugger ............... F01N 3/2889 60/295 |
| 2015/0377110 | A1* | 12/2015 | Sandberg ........... B01D 53/9477 422/171 |
| 2017/0022691 | A1 | 8/2017 | Adam et al. |
| 2018/0258822 | A1 | 9/2018 | Kuramashi et al. |

FOREIGN PATENT DOCUMENTS

| | | | | |
|---|---|---|---|---|
| CN | 206582009 U | | 10/2017 | |
| DE | 10 2009 024 718 A1 | | 12/2010 | |
| DE | 10 2009 056 183 A1 | | 6/2011 | |
| DE | 10 2010 034 705 A1 | | 2/2012 | |
| DE | 10 2015 215 365 A1 | | 2/2017 | |
| DE | 10 2016 210 539 B3 | | 10/2017 | |
| EP | 2960456 A1 | | 12/2015 | |
| FR | 2909124 A3 | * | 5/2008 | ............... F01N 3/28 |
| GB | 2510888 A | * | 8/2014 | ........... F01N 3/2066 |
| WO | WO 2005/113126 A1 | | 12/2005 | |
| WO | WO-2013137105 A1 | * | 9/2013 | ........... F01N 3/2892 |
| WO | WO 2014/183998 A1 | | 11/2014 | |

OTHER PUBLICATIONS

Search report for German Patent Application No. 10 2018 133 634.9, dated Sep. 10, 2019.
Office Action for Chinese Patent Application No. 201911309665X, dated Jun. 2, 2021.

* cited by examiner

EXHAUST GAS AFTERTREATMENT SYSTEM FOR AN INTERNAL COMBUSTION ENGINE

CROSS REFERENCE TO RELATED APPLICATION

This application claims priority from German Patent Application No. 10 2018 133 634.9, filed Dec. 27, 2018, the entire contents of which are incorporated by reference.

FIELD OF THE INVENTION

The invention relates to an exhaust gas aftertreatment system for an internal combustion engine.

BACKGROUND OF THE INVENTION

Due to the high levels of efficiency of gasoline engines, the regeneration of a particulate filter located in the undercarriage requires special driving cycles. In order to regenerate a particulate filter, there is a need for exhaust gas temperatures of, for example, more than 600° C. in the particulate filter. In this case, the particulate filter has to be situated in a position near the engine since this causes higher temperatures to be present in the particulate filter. Moreover, it is currently difficult to provide an ageing-resistant three-way coating on a particulate filter for all markets. Consequently, in order to convert the gaseous components, there might be a need for two additional three-way catalytic converters along with the coated particulate filter. The first one of these three-way catalytic converters is primarily responsible for the so-called light-off while the second three-way catalytic converter increases the total conversion capacity of the exhaust gas aftertreatment system.

The state of the art likewise discloses a three-way catalytic converter that has an uncoated particulate filter and that is positioned near the engine. A drawback of this, however, is that, if there is only one three-way catalytic converter, it has to be configured to be much larger since the uncoated particulate filter cannot contribute in the conversion of the gaseous components. This, in turn, gives rise to light-off problems. Up until now, these problems have been remedied in a complicated manner, namely, by creating additional installation spaces, by using more precious metal on the three-way catalytic converter in the case of an uncoated particulate filter, or by reducing the gaseous raw emissions, possibly entailing disadvantages in terms of the $CO_2$ emissions.

Moreover, an exhaust gas aftertreatment system with two catalytic converters for an internal combustion engine is known from German patent application DE 10 2015 215 365 A1, which discloses an internal combustion engine having a first $NO_x$ storage catalytic converter, a particulate filter that is arranged downstream from the first $NO_x$ storage catalytic converter—as seen in the flow direction of the exhaust gas of the internal combustion engine—as well as a second $NO_x$ storage catalytic converter that is arranged downstream from the first $NO_x$ storage catalytic converter.

International patent application WO 2005/113126 A1 also discloses an exhaust gas treatment system that likewise has an upstream additional catalytic converter. International patent application WO 2014/183998 A1 also discloses the use of several catalytic converters, especially in the form of pre-catalytic converters positioned near the engine.

Before this backdrop, the invention is based on the objective of putting forward an exhaust gas aftertreatment system that has two catalytic converters and a particulate filter and that exhibit an improved light-off behavior and an improved conversion capacity.

SUMMARY OF THE INVENTION

According to the invention, this objective is achieved by an exhaust gas aftertreatment system for an internal combustion engine. The exhaust gas aftertreatment system comprises a first catalytic converter that has an exhaust gas inlet to admit the exhaust gas into the first catalytic converter and an exhaust gas outlet positioned on the opposite side. Moreover, the exhaust gas aftertreatment system comprises a second catalytic converter that is arranged downstream from the first catalytic converter and that is flow-connected to the first catalytic converter in order to allow the exhaust gas to pass from the first catalytic converter into the second catalytic converter, and that likewise has an exhaust gas inlet, whereby the exhaust gas inlet is at a physical distance from the exhaust gas outlet of the first catalytic converter. Moreover, the exhaust gas aftertreatment system also comprises a particulate filter that is arranged downstream from the second catalytic converter and that is flow-connected to the second catalytic converter in order to allow the exhaust gas to pass from the second catalytic converter into the particulate filter. In this process, a flow-around area is formed adjacent to an outer surface of the first catalytic converter in which the exhaust gas flows from the exhaust gas outlet to the exhaust gas inlet into the second catalytic converter.

The first and/or the second catalytic converters are preferably three-way catalytic converters. The particulate filter is preferably a gasoline engine particulate filter. The first catalytic converter can be of a smaller size than the versions known from the state of the art having only one catalytic converter and it can be optimized in terms of achieving a good light-off behavior. The second catalytic converter can display a correspondingly good total conversion capacity. In other words, the term physical distance means that the exhaust gas outlet of the first catalytic converter and the exhaust gas inlet of the second catalytic converter are situated in different spatial positions. As a result, the flow-around area has to have a minimum length. Owing to the characteristics of the flow connection, it is ensured that exhaust gas is conveyed through the first catalytic converter, through the second catalytic converter and through the particulate filter, and that the appertaining catalytic, chemical conversion processes take place. The flow-around area is an area that at least partially or else almost completely surrounds or sheathes the first catalytic converter. Put in other words, the term adjacent can mean that this flow-around area is in physical contact with the outer surface of the first catalytic converter.

The advantage of the invention is that, since the exhaust gas flows around the first catalytic converter through the flow-around area, the first catalytic converter undergoes a temperature increase due to heat exchange with the warm or hot exhaust gas. This warms up the first catalytic converter. This improves the light-off and, as a result, the catalytic conversion in the first catalytic converter is optimized. Moreover, a positive heat balance is achieved since the exhaust gas heat is energetically utilized to heat up the first catalytic converter more quickly to the actively effective catalytic temperature range. Moreover, such a version as well as the additional ones can be implemented package-neutrally and are also cost-effective. This simplifies the regenerations. Furthermore, the invention can be ideally implemented for gaseous pollutants in motor vehicles that belong to high flywheel classes. It is especially advantageous that the first catalytic converter can be uniformly heated owing to the flow-around.

The features described in the dependent claims yield advantageous improvements and non-trivial refinements of the exhaust gas aftertreatment system cited in the independent claim.

In a preferred embodiment, the flow-around area is formed adjacently around a lateral surface of the first catalytic converter. Catalytic converters are usually configured to be cylindrical. The fact that the exhaust gas flows around the cylinder lateral surface advantageously ensures an especially uniform heating of the first catalytic converter.

In a preferred embodiment of the invention, it is provided for the first catalytic converter to be installed in a housing and for the flow-around area to be formed by a space between the housing and the first catalytic converter. This allows a simple and cost-effective implementation of the flow-around area so that the housing walls hold the exhaust gas in the flow-around area and press it—at least by means of gas pressure—into the first catalytic converter. The housing walls can also function as deflection means that serve to deflect the exhaust gas stream.

In a preferred embodiment of the invention, it is provided for a deflection device to be positioned at an outlet side of the first catalytic converter, said deflection device being configured to feed the exhaust gas from the outlet side of the first catalytic converter to the flow-around area of the first catalytic converter. Such a deflection device can be, for example, a metal plate or a baffle plate that imparts the exhaust gas with a desired flow direction. For example, the deflection device can form an opening that is slanted in the deflection direction. A deflection device can improve the flow-around properties of the exhaust gas. In particular, a stream can suitably flow onto the first catalytic converter so that the exhaust gas flows uniformly through the flow-around area. For example, the stream can flow onto a lateral surface of the first catalytic converter in such a way that some of the exhaust gas flows around above the surface and some of the exhaust gas flows around below the surface and, in particular, the flow around the lateral surface is uniform.

In another preferred embodiment, it is provided for the first catalytic converter to have a first exhaust gas conveying direction which allows the exhaust gas to pass through, and whereby the second catalytic converter has a second exhaust gas conveying direction which allows the exhaust gas to pass through, and whereby the first catalytic converter is oriented relative to the second catalytic converter in such a way that the first and the second exhaust gas conveying directions are oriented between 45° and 135° relative to each other, more preferably between 60° and 120° relative to each other, especially preferably perpendicular to each other. In this manner, an arrangement is created that is suitable to allow a deflection so that the exhaust gas can flow through as well as around the first catalytic converter.

In another preferred embodiment of the invention, the flow-around area is configured above and/or below the first catalytic converter—as seen from the first exhaust gas conveying direction in a cross-sectional view of the first catalytic converter. Consequently, uniform heating can be achieved.

In another preferred embodiment of the invention, a first distance is created between the housing and a first catalytic converter on the outlet side and this distance tapers in the second exhaust gas conveying direction. As a result, discharged exhaust gas is deflected in the deflection direction away from the second catalytic converter. The first distance is created between the deflection direction and the first catalytic converter.

In another preferred embodiment of the invention, a second distance is created between the housing and the first catalytic converter on the side facing away from the second catalytic converter, and this second distance widens in the first exhaust gas conveying direction. In this manner, an improved deflection of the exhaust gas in the direction of the second catalytic converter, and thus to the flow-around area, is achieved.

In another preferred embodiment of the invention, the first catalytic converter can be configured as a metal catalytic converter and the second catalytic converter can be configured as a metal catalytic converter or as a ceramic catalytic converter. The metal catalytic converter typically has a better light-off behavior.

In another preferred embodiment of the invention, the first catalytic converter and/or the second catalytic converter is/are provided with a washcoat layer with or without a precious metal. Especially preferably, an HC adsorber, for example, can be used.

In another preferred embodiment of the invention, the particulate filter is provided with a washcoat layer with or without a precious metal.

In another preferred embodiment of the invention, the first catalytic converter is provided with a washcoat layer with a precious metal, the second catalytic converter is provided with a washcoat layer with a precious metal, and the particulate filter is provided with a washcoat layer without a precious metal.

Moreover, a motor vehicle having an internal combustion engine is being put forward, whereby the motor vehicle has an exhaust gas aftertreatment system according to one of the elaborations above.

Unless otherwise indicated in a specific case, the various embodiments of the invention cited in this application can be advantageously combined with each other.

BRIEF DESCRIPTION OF THE DRAWINGS

The invention will be explained below on the basis of embodiments making reference to the accompanying drawings. The following is shown.

DETAILED DESCRIPTION OF THE INVENTION

Figure 1:
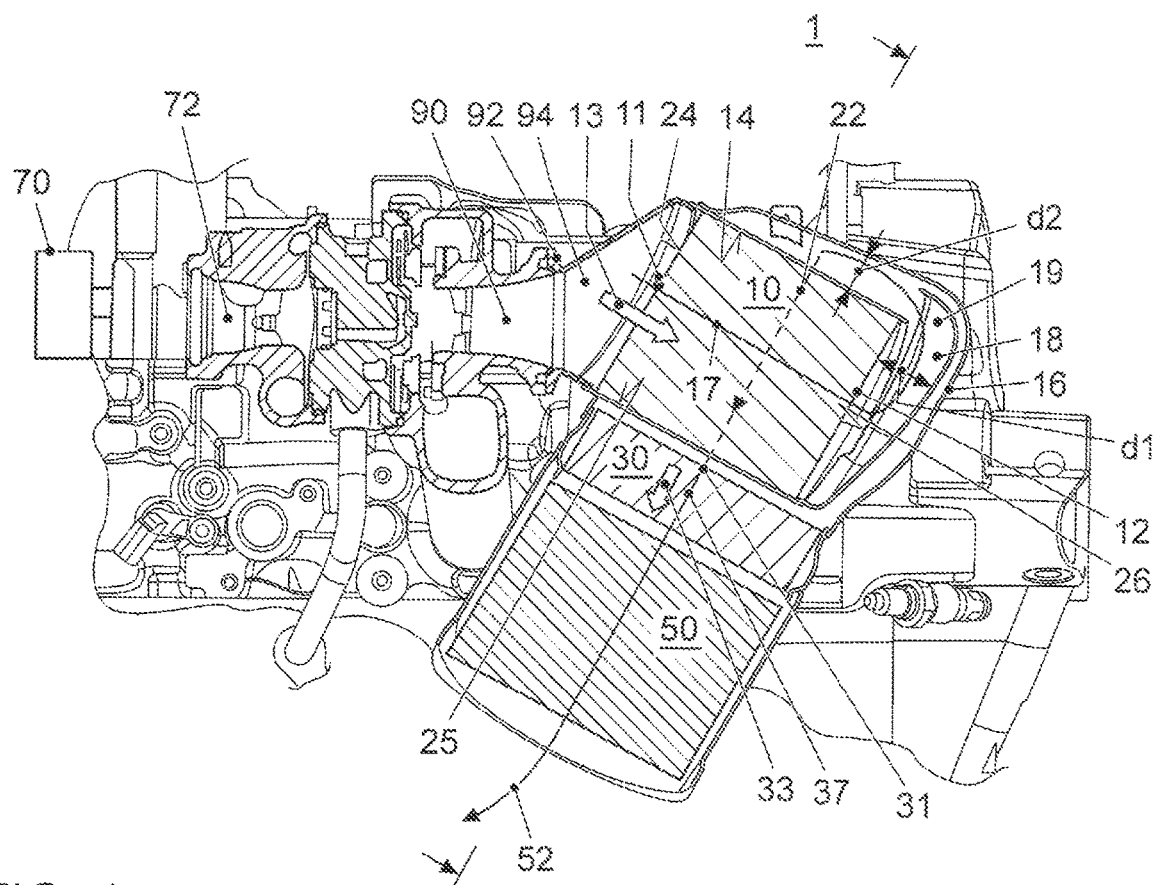
FIG. 1 is an embodiment of an exhaust gas aftertreatment system according to the invention.

FIG. 1 shows an exemplary embodiment of an exhaust gas aftertreatment system 1 according to the invention. Other additional components are shown in the present depiction in which the exhaust gas aftertreatment system 1 has been installed, whereby the technical depiction serves merely for illustration purposes and the invention is not limited to such an implementation. Exhaust gas from an internal combustion engine 70 is fed to the exhaust gas aftertreatment system 1. In this context, the internal combustion engine 70, preferably a gasoline engine, is shown schematically. Moreover, a turbocharger having a compressor 72 and a turbine 90 is shown by way of example. Via a connecting flange 92, for example, an inlet funnel 94 adjoins the turbine 90. In this embodiment, by way of example, the exhaust gas is fed to the exhaust gas aftertreatment system 1 via the inlet funnel 94. In this exemplary embodiment, the inlet funnel 94 is slanted on the outlet side and it deflects the exhaust gas stream away through the tilted funnel opening, as can be seen in FIG. 1, whereby this, too, is only a structurally suitable implementation by way of an example, although the invention is not limited to this.

The exhaust gas aftertreatment system 1 also comprises a first catalytic converter 10. The first catalytic converter 10 also has an exhaust gas outlet 11 to admit the exhaust gas into the first catalytic converter 10. In this exemplary arrangement, a feed side 24 of the first catalytic converter 10 adjoins the funnel opening of the inlet funnel 94. The exhaust gas flows through the first catalytic converter 10 and is discharged again at an exhaust gas outlet 12 situated opposite from the first exhaust gas inlet 11. Moreover, a second catalytic converter 30 is positioned downstream from the first catalytic converter 10.

This second catalytic converter 30 is flow-connected to the first catalytic converter 10 in order to allow the exhaust gas to pass from the first catalytic converter 10 into the second catalytic converter 30. In this preferred embodiment, the second catalytic converter 30 adjoins the first catalytic converter 10 in a compact manner. The second catalytic converter 30 also has an exhaust gas inlet 31 that is at a physical distance from the exhaust gas outlet 12 of the first catalytic converter 10.

The first catalytic converter 10 as well as the second catalytic converter 30 can preferably be configured as three-way catalytic converters that consequently convert carbon monoxide (CO), nitrogen oxides ($NO_x$) and unburned hydrocarbons (HC) into carbon dioxide ($CO_2$), nitrogen ($N_2$) and water ($H_2O$). The first catalytic converter 10 or the second catalytic converter 30 can also be provided with a washcoat layer, especially in the form of suitable metal oxides. The first catalytic converter 10 is preferably configured as a metal catalytic converter because of the faster light-off, while the second catalytic converter 30 can be configured as a metal catalytic converter or as a ceramic catalytic converter.

Moreover, the exhaust gas aftertreatment system 1 comprises a particulate filter 50 arranged downstream from the second catalytic converter 30. This particulate filter 50 is flow-connected to the second catalytic converter 30 in order to allow the exhaust gas to pass from the second catalytic converter 30 into the particulate filter 50. Here, too, by way of example, the particulate filter 50 immediately or directly adjoins the second catalytic converter 30, although the invention is not limited to this. In other embodiments, when yet another, third catalytic converter adjoins the second catalytic converter 30, the particulate filter 50 can also be positioned in the undercarriage of a motor vehicle, that is to say, far away from the engine, and not near the engine as shown in FIG. 1 by way of example. Therefore, in FIG. 1, the first catalytic converter 10, the second catalytic converter 30 as well as the particulate filter 50 are all positioned near the engine. As a result, the waste heat from the catalytic converters 10, 20 as well as from the particulate filter 50 generated in the internal combustion engine 70 is advantageously absorbed, thereby bringing about an improvement of the performance of the catalytic properties. In this context, the particulate filter 50 is preferably a gasoline particulate filter. Preferably, this gasoline particulate filter is configured without a coating in this embodiment, but in other embodiments, appropriate coatings can be provided. By way of example, an outlet 52 leading out of the exhaust gas aftertreatment system 1 is shown behind the particulate filter 50.

A flow-around area 20 is formed adjacently around an outer surface 14 of the first catalytic converter 10. The exhaust gas flows in the flow-around area 20 from the exhaust gas outlet 12 of the first catalytic converter 10 to the exhaust gas inlet 31 into the second catalytic converter 30. In this context, the flow-around area 20 constitutes a flow volume that is in physical contact with the outer surface 14 of the first catalytic converter 10. The flow-around area surrounds or sheathes the first catalytic converter 10 at least partially or else almost completely. The catalytic converters are usually configured to be cylindrical. Then the flow-around area is preferably formed adjacently around a lateral surface of the first catalytic converter 10. As a result, an especially uniform heating of the first catalytic converter or of its catalytic converter substrate is achieved. An exemplary schematic depiction of the flow-around area 20 can be seen in FIG. 2 in a cross sectional view.

Therefore, the exhaust gas flows around the first catalytic converter 10 or around its outer surface 14 after the exhaust gas stream has passed through the first catalytic converter 10. The exhaust gas stream then flows all the way to the second exhaust gas outlet 31 from the exhaust gas outlet 12 of the first catalytic converter 10. Only then is the exhaust gas stream coupled or introduced into the second catalytic converter 30 via the second exhaust gas inlet 31, so that as a result, a catalytic effect is brought about by the second catalytic converter 30.

Purely schematic flow lines have been drawn in FIG. 1 for this purpose, and these lines describe an exemplary flow path. From the exhaust gas outlet 11 of the first catalytic converter, a first catalytic exhaust gas stream 17 flows in a first exhaust gas conveying direction 13 all the way to the exhaust gas outlet 12 of the first catalytic converter 10. A catalytic effect already takes place in this section. Starting from the exhaust gas outlet 12, the exhaust gas stream is deflected and fed to the flow-around area 20. Then the exhaust gas stream forms a heat-exchanging exhaust gas stream 22 that describes an exhaust gas flow path—which is only indicated schematically here due to the cross sectional view—from the exhaust gas outlet 12 through the flow-around area 20 and to a discharge side 25 and then to the exhaust gas inlet 31 of the second catalytic converter 30. In this flow section, heat is transmitted to the first catalytic converter 10. Subsequently, the exhaust gas penetrates into the second catalytic converter 30 via the exhaust gas inlet 31 of the second catalytic converter 30 and forms a second catalytic exhaust gas stream 37 that flows in a second exhaust gas conveying direction 33. A catalytic effect takes place once again in this section.

In this preferred embodiment, the first catalytic converter 10 is accommodated in a housing 16. In this embodiment, the housing 16 surrounds at least the first catalytic converter 10. By virtue of the housing 16, the flow-around area 20 is formed by a space 15 between the housing 16 and the first catalytic converter 10.

Moreover, in this exemplary embodiment, a deflection device 18 is positioned on an outlet side 26 of the first catalytic converter 10 where the exhaust gas outlet 12 is positioned. This deflection device 18 is configured to feed the exhaust gas from the outlet side 26 of the first catalytic converter 10 to the flow-around area 20 of the first catalytic converter 10. Such a deflection device can be, for example, a metal plate or a baffle plate that imparts the exhaust gas with a desired flow direction. For example, the deflection device 18 can have an opening that is oriented in the deflection direction. In this context, the opening can have various orientations so that the flow optimally strikes the first catalytic converter 10 in a certain manner, depending on the geometry and on the arrangement. In particular, this yields a suitable flow towards the first catalytic converter 10 so that the exhaust gas flows uniformly through the flow-around area.

In this embodiment, the first catalytic converter 10 is oriented vertically relative to the second catalytic converter 30. In other words, this means that the first exhaust gas conveying direction 13 is oriented perpendicular to the second exhaust gas conveying direction 33. As a result, the exhaust gas stream is deflected by effectively 90° inside the housing 16 from the first exhaust gas conveying direction 13 in the direction of the second exhaust gas conveying direction 33. In other embodiments of the invention, the first and the second exhaust gas conveying directions 13, 33 can be oriented between 45° and 135° relative to each other, more preferably between 60° and 120°.

In this exemplary embodiment, the first catalytic converter 10 and the second catalytic converter 30 have a linear arrangement. Here, in particular, the first catalytic converter 10, the second catalytic converter 30 and the particulate filter 50 even form a linear arrangement, which translates into a compact structure.

The exhaust gas stream from the outlet side 26 of the first catalytic converter 10 is deflected by the housing 16 and/or deflected with the assistance of the deflection device 18 positioned in-between.

For this purpose, the housing 16 is oriented on the outlet side 26 in such a way that the outgoing exhaust gas stream is deflected, here initially from the first exhaust gas conveying direction 13 in the opposite direction to the second exhaust gas conveying direction 33. Here, the housing 16 forms a bulging rounded segment 19 on the outlet side 26. In this case, by way of example, the rounded segment 19 extends towards the outside in order to assist the deflection of the exhaust gas stream away from the second catalytic converter 30.

For example, a first distance d1 between the housing 16 and the first catalytic converter 10 on the outlet side 26 can taper in the second exhaust gas conveying direction 33 so that the incoming exhaust gas stream is deflected away from the second catalytic converter 30. Moreover, in this embodiment, the housing 16 has a rounded segment 19 in order to improve the flow-around properties. Furthermore, as shown by way of example in FIG. 1, a second distance d2 between the housing 16 and the first catalytic converter 10 can widen in the first exhaust gas conveying direction 13 on the side facing away from the second catalytic converter 30. As a result, the entry into the flow-around area 20 adjacent to the outer surface 14 can be improved in the direction of the second catalytic converter 30.

Figure 2:
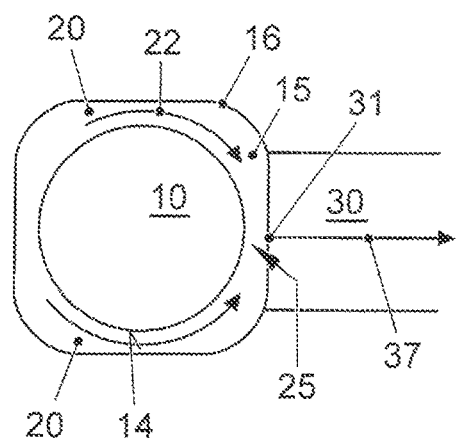
FIG. 2 is a cross sectional view of the first catalytic converter in the configuration according to the invention.

FIG. 2 shows a cross sectional view of the first catalytic converter 10—as seen in the first exhaust gas conveying direction 13; in this context, also see the sectional view references shown in FIG. 1.

Here, the cross section of the first catalytic converter 10 is configured cylindrically purely by way of example. The flow-around area 20 is adjacent to the outer surface 14 of the first catalytic converter 10. The outer surface 14 forms a lateral surface of the first catalytic converter 10. Purely by way of example, a flow-around area 20 is shown schematically as a space 15 between the first catalytic converter 10 and the housing 16.

The flow-around area 20 in the cross sectional view of the first catalytic converter 10—as seen from the first exhaust gas conveying direction 13—is formed by way of example above and below the first catalytic converter 10. This means that the lateral surface—as seen in the cross section—divides the exhaust gas stream into two flow components that flow in opposite rotational directions in the flow-around area 20 around the first catalytic converter 10; in this context, see the drawn arrows. In this manner, a particularly uniform heating is achieved, whereby the invention is not restricted to this. However, the invention is not limited to such a flow-around course.

After the exhaust gas stream has flowed around the first catalytic converter 10, it enters the second catalytic converter 30 where the catalytic reactions then take place. The exhaust gas then follows the catalytic exhaust gas stream 37 as shown in FIG. 1.

LIST OF REFERENCE NUMERALS 1 exhaust gas aftertreatment system
10 first catalytic converter
11 exhaust gas inlet
12 exhaust gas outlet
13 first exhaust gas conveying direction
14 outer surface
15 space
16 housing
17 first catalytic exhaust gas stream
18 deflection direction
19 rounded segment
20 flow-around area
22 heat-exchanging exhaust gas stream
24 feed side
25 discharge side
26 outlet side
30 second catalytic converter
31 exhaust gas inlet
33 second exhaust gas conveying direction
37 second catalytic exhaust gas stream
50 particulate filter
52 outlet
70 internal combustion engine
72 compressor
90 turbine
92 flange
94 inlet funnel
d1 first distance
d2 second distance

The invention claimed is:

1. An exhaust gas aftertreatment system for an internal combustion engine, comprising:
a first catalytic converter that has an exhaust gas inlet to admit exhaust gas into the first catalytic converter and an exhaust gas outlet positioned on an opposite side of the first catalytic converter therefrom, wherein the first catalytic converter is installed in a housing and is configured to be cylindrical;
a second catalytic converter that is arranged downstream from the first catalytic converter and that is flow-connected to the first catalytic converter in order to allow the exhaust gas to pass from the first catalytic converter into the second catalytic converter, and that has an exhaust gas inlet that is at a physical distance from the exhaust gas outlet of the first catalytic converter;
a particulate filter that is arranged downstream from the second catalytic converter and that is flow-connected to the second catalytic converter in order to allow the exhaust gas to pass from the second catalytic converter into the particulate filter;

a flow-around area formed adjacent to an outer surface of the first catalytic converter in which the exhaust gas flows from the exhaust gas outlet to the exhaust gas inlet of the second catalytic converter, wherein the flow-around area is formed by a space between the housing and the first catalytic converter and surrounds the first catalytic converter; and a first exhaust gas conveying direction distance that is created between the housing and the first catalytic converter on a side facing away from the second catalytic converter, wherein this first exhaust gas conveying direction distance widens in the first exhaust gas conveying direction.

2. The exhaust gas aftertreatment system according to claim 1, wherein the flow-around area is formed adjacently around a lateral surface of the first catalytic converter.

3. The exhaust gas aftertreatment system according to claim 1, further comprising a deflection device being positioned at an outlet side of the first catalytic converter, said deflection device being configured to feed the exhaust gas from the outlet side of the first catalytic converter to the flow-around area of the first catalytic converter.

4. The exhaust gas aftertreatment system according to claim 1,
wherein the first catalytic converter has a first exhaust gas conveying direction to allow the exhaust gas to pass through,
wherein the second catalytic converter has a second exhaust gas conveying direction to allow the exhaust gas to pass through, and
wherein the first catalytic converter is oriented relative to the second catalytic converter in such a way that the first and the second exhaust gas conveying directions are oriented between 45° and 135° relative to each other.

5. The exhaust gas aftertreatment system according to claim 4, wherein the first catalytic converter is oriented relative to the second catalytic converter in such a way that the first and the second exhaust gas conveying directions are oriented between 60° and 120° relative to each other.

6. The exhaust gas aftertreatment system according to claim 5, wherein the first catalytic converter is oriented relative to the second catalytic converter in such a way that the first and the second exhaust gas conveying directions are oriented perpendicular to each other.

7. The exhaust gas aftertreatment system according to claim 1, wherein the flow-around area is configured above and/or below the first catalytic converter, as seen from the first exhaust gas conveying direction in a cross sectional view of the first catalytic converter.

8. The exhaust gas aftertreatment system according to claim 1, further comprising a second exhaust gas conveying direction distance that is created between the housing and the first catalytic converter on the outlet side, wherein this second exhaust gas conveying direction distance tapers in the second exhaust gas conveying direction.

9. The exhaust gas aftertreatment system according to claim 1, wherein the first catalytic converter is configured as a metal catalytic converter, and wherein the second catalytic converter is configured as a metal catalytic converter or as a ceramic catalytic converter.

10. The exhaust gas aftertreatment system according to claim 1, wherein the first catalytic converter and/or the second catalytic converter is/are provided with a washcoat layer with or without a precious metal.

11. The exhaust gas aftertreatment system according to claim 1, wherein the particulate filter is provided with a washcoat layer with or without a precious metal.

12. A motor vehicle, comprising an internal combustion engine with an exhaust gas aftertreatment system according to claim 1.

* * * * *